United States Patent
Van Goor et al.

(10) Patent No.: US 12,507,334 B2
(45) Date of Patent: Dec. 23, 2025

(54) EXECUTING CONTROL COMMAND IN DEPENDENCE ON PRESENCE BEING DETECTED

(71) Applicant: SIGNIFY HOLDING B.V., Eindhoven (NL)

(72) Inventors: Dave Willem Van Goor, Nederweert Eind (NL); Richard Ludwig Eduard Van Haasen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 436 days.

(21) Appl. No.: 17/926,349

(22) PCT Filed: May 25, 2021

(86) PCT No.: PCT/EP2021/063775
§ 371 (c)(1),
(2) Date: Nov. 18, 2022

(87) PCT Pub. No.: WO2021/239671
PCT Pub. Date: Dec. 2, 2021

(65) Prior Publication Data
US 2023/0199932 A1   Jun. 22, 2023

(30) Foreign Application Priority Data
May 29, 2020 (EP) .................... 20177463

(51) Int. Cl.
*H05B 47/115* (2020.01)
*H05B 47/175* (2020.01)
(Continued)

(52) U.S. Cl.
CPC .......... *H05B 47/115* (2020.01); *H05B 47/19* (2020.01); *H05B 47/1965* (2024.01);
(Continued)

(58) Field of Classification Search
CPC ....... H05B 47/19; H05B 47/15; H04W 12/08; H04W 12/65
See application file for complete search history.

(56) References Cited

U.S. PATENT DOCUMENTS

2016/0203706 A1   7/2016   Holtman et al.
2019/0035244 A1 *  1/2019   Garg .................... H04B 17/318
(Continued)

FOREIGN PATENT DOCUMENTS

JP   2013197097 A   9/2013
WO   2008037899 A2  4/2008
(Continued)

OTHER PUBLICATIONS

Donovan, John, "Security Issues With Wi-Fi, Bluetooth, and Zigbee," Contributed by Convergence Promotions LLC, Digi-Keys Electronics, May 2012 (8 Pages).
(Continued)

*Primary Examiner* — Alexander H Taningco
*Assistant Examiner* — Pedro C Fernandez

(57) ABSTRACT

A device (1) controllable by a short-range point-to-point radio frequency signal, e.g. a Bluetooth signal from a mobile device (23), is configured to receive, e.g. from the mobile device and neighboring lighting devices (11-12), one or more signals which comprise the short-range point-to-point radio frequency signal, determine changes in received radio frequency signals from the one or more signals, detect presence, e.g. of a resident (51), based on the changes, determine a control command from the short-range point-to-point radio frequency signal, and execute the control command in dependence on the presence being detected.

14 Claims, 6 Drawing Sheets

(51) Int. Cl.
*H05B 47/19* (2020.01)
*H04W 12/08* (2021.01)
*H04W 12/65* (2021.01)

(52) U.S. Cl.
CPC ............ *H04W 12/08* (2013.01); *H04W 12/65* (2021.01); *H05B 47/199* (2024.01)

(56) References Cited

U.S. PATENT DOCUMENTS

2021/0063556 A1* 3/2021 Usaj ................. G01S 13/04
2021/0185485 A1* 6/2021 Deixler .............. H04W 4/80
2021/0212187 A1 7/2021 Meerbeek et al.

FOREIGN PATENT DOCUMENTS

WO 2019048278 A1 3/2019
WO 2019185200 A1 10/2019
WO 2020043592 A1 3/2020

OTHER PUBLICATIONS

Matthews, Alice, "Iot Software Enables Zigbee and Bluetooth to Work Together, " Electronic Specifier, Wireless, Silicon Laboratories, Nov. 2017 (7 Pages).

* cited by examiner

EXECUTING CONTROL COMMAND IN DEPENDENCE ON PRESENCE BEING DETECTED

CROSS-REFERENCE TO PRIOR APPLICATIONS

This application is the U.S. National Phase application under 35 U.S.C. § 371 of International Application No. PCT/EP2021/063775, filed on May 25, 2021, which claims the benefit of European Patent Application No. 20177463.5, filed on May 29, 2020. These applications are hereby incorporated by reference herein.

FIELD OF THE INVENTION

The invention relates to a device controllable by a short-range point-to-point radio frequency signal.

The invention further relates to a method of controlling a device by a short-range point-to-point radio frequency signal.

The invention also relates to a computer program product enabling a computer system to perform such a method.

BACKGROUND OF THE INVENTION

In connected lighting networks, it is becoming more and more common to use combinations of multiple protocols. Sometimes the same RF transceiver within a lighting device can be used for both Zigbee and Bluetooth (e.g. Bluetooth Low Energy). New Philips Hue light bulbs typically include an RF transceiver that can be used for both Zigbee and Bluetooth, for example. Such an RF transceiver can be used to commission lighting devices in a more secure manner, as disclosed in WO 2019/048278 A1, for example.

A more common use case is to allow lighting devices to be controlled with a mobile device, e.g. a mobile phone or a tablet, using Bluetooth. However, making a lighting device controllable by a short-range point-to-point radio frequency signal gives hackers or malicious users the opportunity to control the lighting device without permission, e.g. by sneaking in a small Bluetooth device that can make a connection with the lighting network at any moment in time. Such a person may then be able turn on all the lights of a complete building-floor in the middle of the night.

SUMMARY OF THE INVENTION

It is a first object of the invention to provide a device which is difficult to control by a short-range point-to-point radio frequency signal transmitted by malicious users.

It is a second object of the invention to provide a method of controlling a device which makes it difficult to control the device by a short-range point-to-point radio frequency signal transmitted by malicious users.

In a first aspect of the invention, a device controllable by a short-range point-to-point radio frequency signal comprises at least one input interface and at least one processor configured to receive one or more signals via the at least one input interface, the one or more signals comprising the short-range point-to-point radio frequency signal, determine changes in received radio frequency signals from the one or more signals, detect presence based on the changes, determine a control command from the short-range point-to-point radio frequency signal, and execute the control command in dependence on the presence being detected. The control command is comprised in the short-range point-to-point radio frequency signal. For example, the short-range point-to-point radio frequency signal may be a Bluetooth signal and the command is sent by e.g. a mobile phone, via the Bluetooth signal, to the device.

When the presence of a person is detected when (or no more than a predetermined time before or no more than a predetermined time after) the short-range point-to-point radio frequency signal is received, it is avoided that the device is controlled by e.g. a hacked mobile phone that is left behind within range of the device to be controlled while the user is not present. Thus, allowing someone to maliciously control the device without the user noticing. However, when the control command comprised in the short-range point-to-point radio frequency signal is only executed by the device if presence of a person is detected, this may make it unattractive for e.g. a hacker to maliciously control the device as the user would detect it. This may then cause the user to solve the security issue (e.g. run virus scanner software on the mobile phone and/or update security or other settings) or fix what the malicious control has caused, is causing or will cause (e.g. by turning off the device that was maliciously controlled or sending a different control command).

By using RF-based sensing to detect (human) presence and only allowing the (e.g. lighting) device to be controlled by a short-range point-to-point radio frequency signal if presence is detected, it becomes difficult for hackers or malicious users to control the device without permission, as they are not able to control a device in a room in which no one is present. Since controllable devices often use an RF transceiver anyway, RF-based sensing can be implemented relatively cheaply. If the controllable device is a lighting device, the control command may comprise a color setting, an on/off setting and/or a dim level, for example.

The processor may be configured to determine the changes in the (plurality of) received radio frequency signals from the one or more signals by determining changes in characteristics of the received radio frequency signals from the one or more signals, wherein each of the characteristics is indicative of a distance between a transmitter of a respective radio frequency signal and a receiver of the respective radio frequency signal. The processor may be configured to determine the changes by determining changes in signal strengths of received radio frequency signals or changes in channel states (e.g. CSIs) associated with the received radio frequency signals, for example.

The short-range point-to-point radio frequency signal may conform to a first communication protocol and the device may be further controllable by a further radio frequency signal transmitted by a further device, the further radio frequency signal conforming to a second communication protocol. By allowing the device to be controlled via multiple communication protocols, more flexibility is provided to users.

The further radio frequency signal may also be a short-range point-to-point radio frequency signal, e.g. a signal from a device in a Zigbee star network or an infrared signal. Alternatively, the further radio frequency may be a long-range radio frequency signal, e.g. a Wi-Fi or LoRa signal, and/or be transmitted over a mesh network, e.g. a Zigbee or LoRa mesh network. The first communication protocol may be Bluetooth and the second communication protocol may be Zigbee, for example.

The one or more signals may comprise the further radio frequency signal and the at least one processor may be configured to determine a further control command from the further radio frequency signal, determine whether the further device is trusted, and execute the further control command in dependence on the further device being trusted. The further device may be a bridge, for example. Creating trusted relationships between each mobile device and each controllable device is in practice not feasible, but if a bridge is used, it is possible to create trusted associations between each mobile device and the bridge and between each controllable device and the bridge. In this case, it is typically not necessary to detect presence when a user controls the controllable device via the bridge.

The at least one processor may be configured to determine the changes by determining changes between a recently received radio frequency signal and a reference radio frequency signal. This is how RF-based sensing is normally implemented.

The one or more signals may comprise the recently received frequency signal and/or a characteristic of the recently received frequency signal. The controllable device may analyze the, e.g. signal strength of, RF signals it receives from other devices in the sensor network, but additionally or alternatively, use the analyses performed by the other devices in the sensor network.

The recently received signal is preferably received at most a predetermined amount of time before the short-range point-to-point radio frequency signal is received. By making sure the presence detection uses recent information, it is not possible for a hacker or malicious user is to control the lighting device just after the last user has left the room.

The at least one processor may be configured to both determine the changes in the received radio frequency signals and detect the presence based on the changes upon receiving the short-range point-to-point radio frequency signal and/or upon receiving a user request to detect presence again. If presence detection is not needed for another application, e.g. automatic control of lighting devices, the analysis of the RF signals and/or characteristics thereof may be postponed until a control command is received, thereby reducing power consumption. If a user is not detected to be present, he may be provided the option to request that the presence detection is repeated, i.e. that a re-scan of the space is performed. The user may move to a different position, e.g. different room, before making this request.

In a second aspect of the invention, a method of controlling a device by a short-range point-to-point radio frequency signal comprises receiving one or more signals, the one or more signals comprising the short-range point-to-point radio frequency signal, determining changes in received radio frequency signals from the one or more signals, detecting presence based on the changes, determining a control command from the short-range point-to-point radio frequency signal, and executing the control command in dependence on the presence being detected. The method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a device by a short-range point-to-point radio frequency signal.

The executable operations comprise receiving one or more signals, the one or more signals comprising the short-range point-to-point radio frequency signal, determining changes in received radio frequency signals from the one or more signals, detecting presence based on the changes, determining a control command from the short-range point-to-point radio frequency signal, and executing the control command in dependence on the presence being detected.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
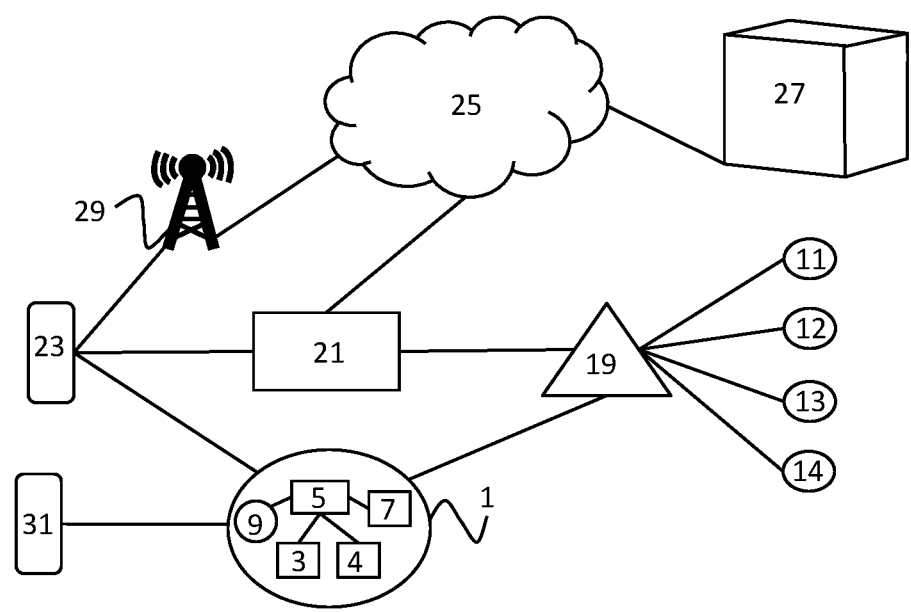
FIG. 1 is a block diagram of an embodiment of the controllable device.

FIG. 1 shows an embodiment of a device controllable by a short-range point-to-point radio frequency signal: lighting device 1. The lighting device 1 is part of a lighting system which further includes a bridge 19 and further lighting devices 11-14. The bridge 19, the lighting device 1 and the further lighting devices 11-14 form a mesh and/or star network, e.g. a Zigbee mesh network. The bridge 19 may be a Hue bridge, for example.

In the example of FIG. 1, the lighting device 1 and the further lighting devices 11-14 also form a sensor network for RF-based sensing. Although the further lighting devices 11-14 are controllable, they are not controllable by a short-range point-to-point radio frequency signal. In an alternative embodiment, one or more of the lighting devices 11-14 are also controllable by a short-range point-to-point radio frequency signal and may be configured in the same way as described below in relation to lighting device 1. The bridge 19 may also be part of the same sensor network.

The lighting device 1 comprises a receiver 3, a transmitter 4, a processor 5, a memory 7 and a light element 9. The processor 5 is configured to receive one or more signals via receiver 3, determine changes in received radio frequency signals from the one or more signals, detect presence based on the changes, determine a control command from a short-range point-to-point radio frequency signal comprised in the received one or more signals, and execute the control command in dependence on the presence being detected. The control command may comprise a color setting, an on/off setting and/or a dim level, for example.

In the example of FIG. 1, control commands for the lighting device 1 are created on mobile devices 23 and 31. Mobile device 23 may transmit the control command in either a short-range point-to-point radio frequency signal, e.g. via Bluetooth, or via the bridge 19. In the example of FIG. 1, the mobile device 23 is able to communicate with the bridge 19 via the wireless LAN access point 21, possibly via a base station 29 of a mobile communication network (e.g. LTE or 5G network).

The bridge 19 may be connected to the wireless LAN access point 21 via Ethernet or Wi-fi, for example. The wireless LAN access point 21 and the base station 29 are connected to the Internet 25. An Internet server 27 is also connected to the Internet 25. For example, the Internet server 27 may be an Amazon Alexa server or IFTTT ("IF This Then That") server, which may be used to send control commands to the lighting devices via the bridge 19. Mobile device 31 may transmit a control command in a short-range point-to-point radio frequency signal, e.g. via Bluetooth.

In the embodiment of FIG. 1, the processor 5 is configured to receive a further radio frequency signal comprising a further control command from the bridge 19 and determine whether the bridge 19 is trusted. For example, a physical button may need to be pressed when commissioning the lighting device 1 in the lighting system to pair the lighting device 1 with the bridge 19, i.e. join the mesh network. In this case, after this pairing has been successfully completed, the bridge 19 is identified as a trusted device in the memory 7. For example, an (encrypted) network key or a public key of the bridge 19 may be received during pairing and stored in the memory 7.

Any mobile device trusted by the bridge 19 is then able to control the lighting device 1. The further control command (message) may comprise an (encrypted) network key or be signed with a private key of the bridge 19, for example. Mobile device 23 may be paired with the bridge 19 in a similar manner. The processor 5 is further configured to execute the further control command in dependence on the bridge 19 being trusted.

In the embodiment of the lighting device 1 shown in FIG. 1, the lighting devices comprises one processor 5. In an alternative embodiment, the lighting device comprises multiple processors. The processor 5 of the lighting devices 1 may be a general-purpose processor or an application-specific processor. The light element 9 may be, for example, a LED (package), e.g. a direct emitting or phosphor converted LED. In an alternative embodiment, the lighting device 1 comprises more than one light element. The memory 7 may comprise one or more memory units. The memory 7 may comprise solid-state memory, for example.

The receiver 3 and the transmitter 4 may use one or more wired or wireless communication technologies, e.g. Zigbee to communicate with the bridge 19 and Bluetooth to communicate directly with the mobile devices 23 and 31. In an alternative embodiment, multiple receivers and/or multiple transmitters are used instead of a single receiver and a single transmitter.

In the embodiment shown in FIG. 1, a separate receiver and a separate transmitter are used. In an alternative embodiment, the receiver 3 and the transmitter 4 are combined into a transceiver. This transceiver may comprise a combined multiprotocol RF chip, for example. The lighting device 1 may comprise other components typical for a (connected) lighting device such as a power connector. The invention may be implemented using a computer program running on one or more processors.

Figure 2:
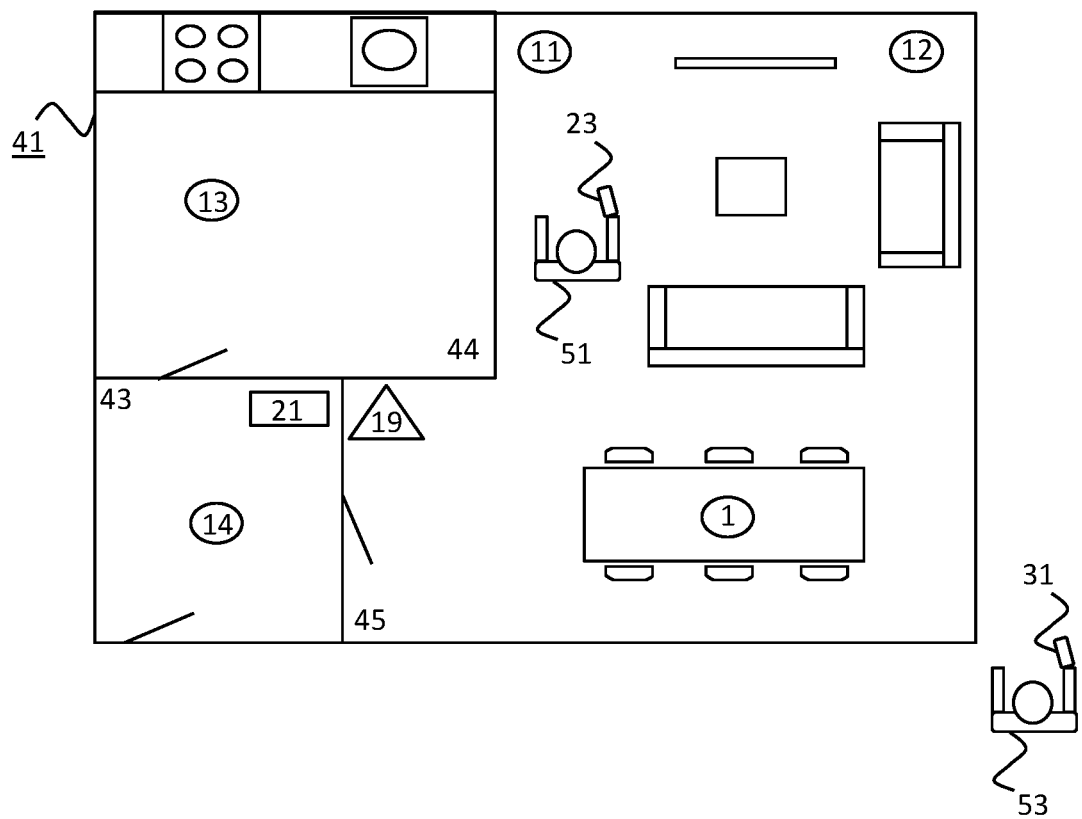
FIG. 2 shows an example of a space in which the devices of FIG. 1 may be used.

FIG. 2 shows an example of a space in which the devices of FIG. 1 may be used: a first floor 41 of a house. The floor 41 comprises a hallway 43, a kitchen 44 and a living room 45. Bridge 19 and lighting devices 1, 11, and 12 have been installed in the living room 45. Lighting device 13 has been installed in the kitchen 44. Wireless LAN access point 21 and lighting device 14 have been installed in the hallway 43. A resident 51 of the home is inside the home, in living room 45, controlling lighting device 1 with his mobile device 23. A malicious user 53 is outside the home trying to control lighting device 1 with his mobile device 31, e.g. after the resident 51 has gone upstairs or has left his home.

As described in relation to FIG. 1, the lighting device 1, the lighting devices 11-14, and the bridge 19 form a lighting connectivity network. Such a lighting connectivity network can span multiple rooms and usually uses a technology like Zigbee for communicating to all connected lighting devices. The lighting device 1, the lighting devices 11-14, and optionally the bridge 19, also form a sensor network for RF-based sensing.

With RF-based sensing, it is possible to determine if a human is present in a room. Often, the Received Signal Strength Indicator (RSSI) strength of the received RF signal is measured to determine if it has changed compared to a reference measurement that has been done when the room was empty. With RF-based sensing, clusters of multiple lighting devices are typically mapped to a certain room. For example, lighting device 1 (or bridge 19) and lighting devices 13 and 14 may be used to detect presence in the hallway 43, lighting devices 11, 13 and 14 (and optionally bridge 19) may be used to detect presence in the kitchen 44, and lighting devices 1, 11 and 12 (and optionally bridge 19) may be used to detect presence in the living room 45.

Room-based clusters can be formed within a Zigbee network, for example. In this case, RF-based sensing may be performed using interpan Zigbee messages, for example. By collecting the RSSI values of all Zigbee interpan messages received by RF nodes inside a room, it is possible determine if a person is present in that same room based on these RSSI values.

Now, when resident 51 wants to control the lighting device 1 with his mobile device 23 via Bluetooth, first it is checked (using RF-based sensing) whether there actually is a person physically present in the room. Only if it is determined that a person is in the same room as the lighting device that the user wants to control, the user is able to control this lighting device.

Thus, by requiring that a human operator needs to be present in the same room as the lighting device(s) to be controlled, the malicious user 53 cannot take over the lighting control after the resident 51 has gone upstairs or has left his home. If the malicious user 53 is able to take over control of lighting device 1 while the resident 51 is still in the living room 45, the resident 51 will quickly find out and can take appropriate action.

Figure 3:
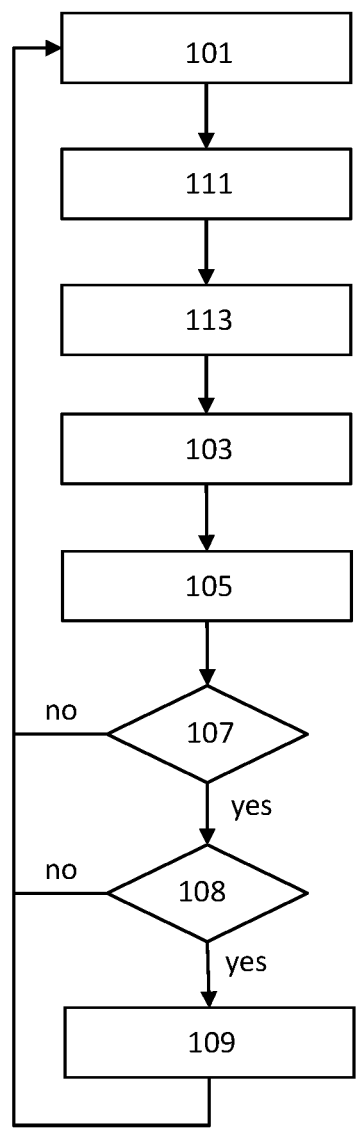
FIG. 3 is a flow diagram of a first embodiment of the method.

A first embodiment of the method of controlling a device by a short-range point-to-point radio frequency signal is shown in FIG. 3. A step 101 comprises receiving a signal. A step 111 comprises determining a characteristic of the signal received in step 101. The characteristic may be the signal strength of the signal or the Channel State Information (CSI) associated with the signal, for example. In the embodiment of FIG. 3, characteristics are determined from all received signals. In an alternative embodiment, characteristics are only determined from certain signals, e.g. from signals received from certain devices.

A step 113 comprises storing the characteristic determined in step 111 along with a time stamp in a memory. A step 103 comprises determining changes in received radio frequency signals from the signals received in the current iteration and in previous iterations of step 101. Specifically, step 103 comprises obtaining the characteristics, e.g. signal strengths, and time stamps stored in the current iteration and in previous iterations of step 113 and determining changes in these characteristics.

In the embodiment of FIG. 3, changes between recently received radio frequency signals and reference radio frequency signals are determined. The recently received radio frequency signals whose changes with reference radio frequency signals are determined are received at most a predetermined amount of time before the signal was received in the current iteration of step 101, as determined from the time stamps.

The reference radio frequency signals may comprise preceding radio frequency signals, for example. This allows patterns to be recognized from the changes between successively received signals. Alternatively or additionally, the reference radio frequency signals may comprise baseline radio frequency signals whose characteristics were recorded when no human and/or animal was present. A step 105 comprises detecting presence based on the changes determined in step 103.

A step 107 comprises determining whether the signal received in step 101 is a short-range point-to-point radio frequency signal which comprises a control command. If so, a step 108 is performed next. If not, step 101 is repeated and the method proceeds as shown in FIG. 3. Step 108 comprises determining whether presence was detected in step 105. If so, step 109 is performed next. If not, step 101 is repeated and the method proceeds as shown in FIG. 3. Step 109 comprises executing the control command determined in step 107, e.g. controlling one or more light sources. Step 101 is repeated after step 109, after which the method proceeds as shown in FIG. 3.

Figure 4:
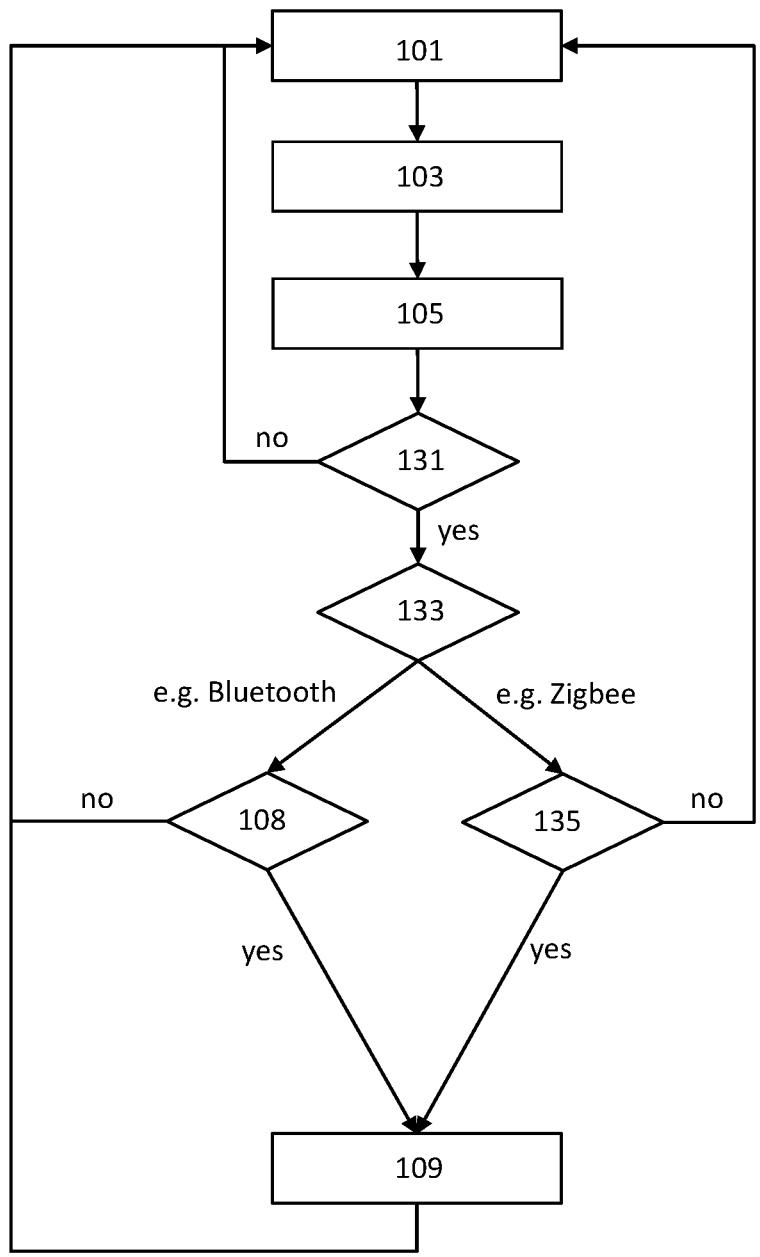
FIG. 4 is a flow diagram of a second embodiment of the method.

A second embodiment of the method of controlling a device by a short-range point-to-point radio frequency signal is shown in FIG. 4. In the embodiment of FIG. 4, the controllable device is further controllable by a further radio frequency signal transmitted by a further device. The further device may be a bridge, for example.

Step 101 comprises receiving a signal. Step 103 comprises determining changes in received radio frequency signals from the signals received in the current iteration and in previous iterations of step 101. Step 105 comprises detecting presence based on the changes determined in step 103. Steps 111 and 113 may be performed between steps 101 and 103, as shown in FIG. 3. After step 105, a step 131 comprises determining whether the signal received in step 101 comprises a control command. If so, a step 133 is performed next. If not, step 101 is repeated and the method proceeds as shown in FIG. 4.

Step 133 comprises determining whether the signal received in step 101 is a short-range point-to-point radio frequency signal which conforms to a first communication protocol, e.g. Bluetooth, or is a further radio frequency signal which conforms to a second communication protocol, e.g. Zigbee. The further radio frequency signal may also be a short-range point-to-point radio frequency signal or may alternatively be, a long-range radio frequency signal and/or a signal transmitted over a mesh network (and therefore not point-to-point). A single mobile device may be able to transmit both a radio frequency signal which conforms to the first communication protocol and a radio frequency signal which conforms to the second communication protocol.

If it is determined in step 133 that the signal received in step 101 is a short-range point-to-point radio frequency signal which conforms to the first communication protocol, step 108 is performed. Step 108 comprises determining whether presence was detected in step 105. If so, step 109 is performed next. If not, step 101 is repeated and the method proceeds as shown in FIG. 4.

If it is determined in step 133 that the signal received in step 101 is a further radio frequency signal which conforms to the second communication protocol, a step 135 is performed. Step 135 comprises determining whether the further device that transmitted the further radio frequency signal is trusted or not. If the further device is determined to be trusted, step 109 is performed next. If not, step 101 is repeated and the method proceeds as shown in FIG. 4.

Step 109 comprises executing the control command determined in step 133, e.g. controlling one or more light sources. Step 101 is repeated after step 109, after which the method proceeds as shown in FIG. 4.

Figure 5:
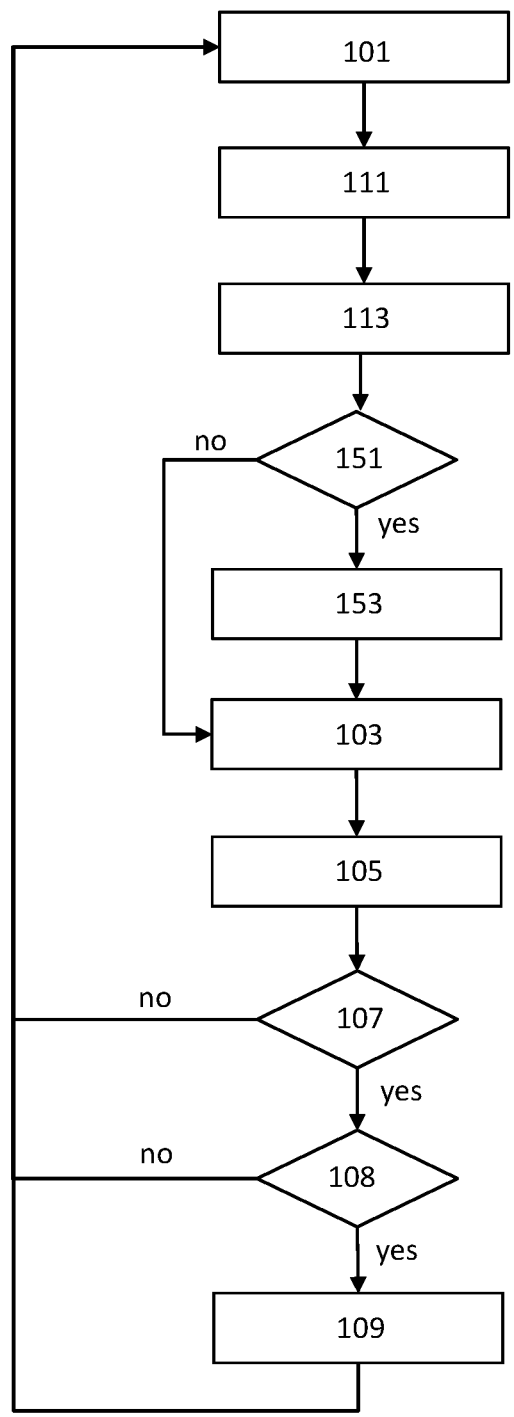
FIG. 5 is a flow diagram of a third embodiment of the method.

A third embodiment of the method of controlling a device by a short-range point-to-point radio frequency signal is shown in FIG. 5. This third embodiment is a variant on the first embodiment of FIG. 3. In the embodiment of FIG. 5, a step 151 is performed after step 113. Step 151 comprises determining whether the signal received in step 101 comprises one or more characteristics of recently received frequency signals. These recently received frequency signals are typically received by other devices in the same sensing network.

If it is determined in step 151, that the signal received in step 101 comprises one or more characteristics of recently received frequency signals, a step 153 is performed. If not, step 153 is skipped and step 103 is performed. Step 153 comprises storing the one or more characteristics received in step 101 along with a time stamp in the memory. These one or more time stamps are preferably extracted from the received signal if they are included in the received signal. If not, the time of receipt of the signal may be stored as the time stamp(s). Step 103 is performed after step 153. The method then proceeds as described in relation to FIG. 5.

In the embodiment of FIG. 5, characteristics are not only received from one or more other devices, but also determined from the signal itself (in step 111). In an alternative embodiment, characteristics are not determined from the signal itself and steps 111 and 113 are omitted.

Figure 6:
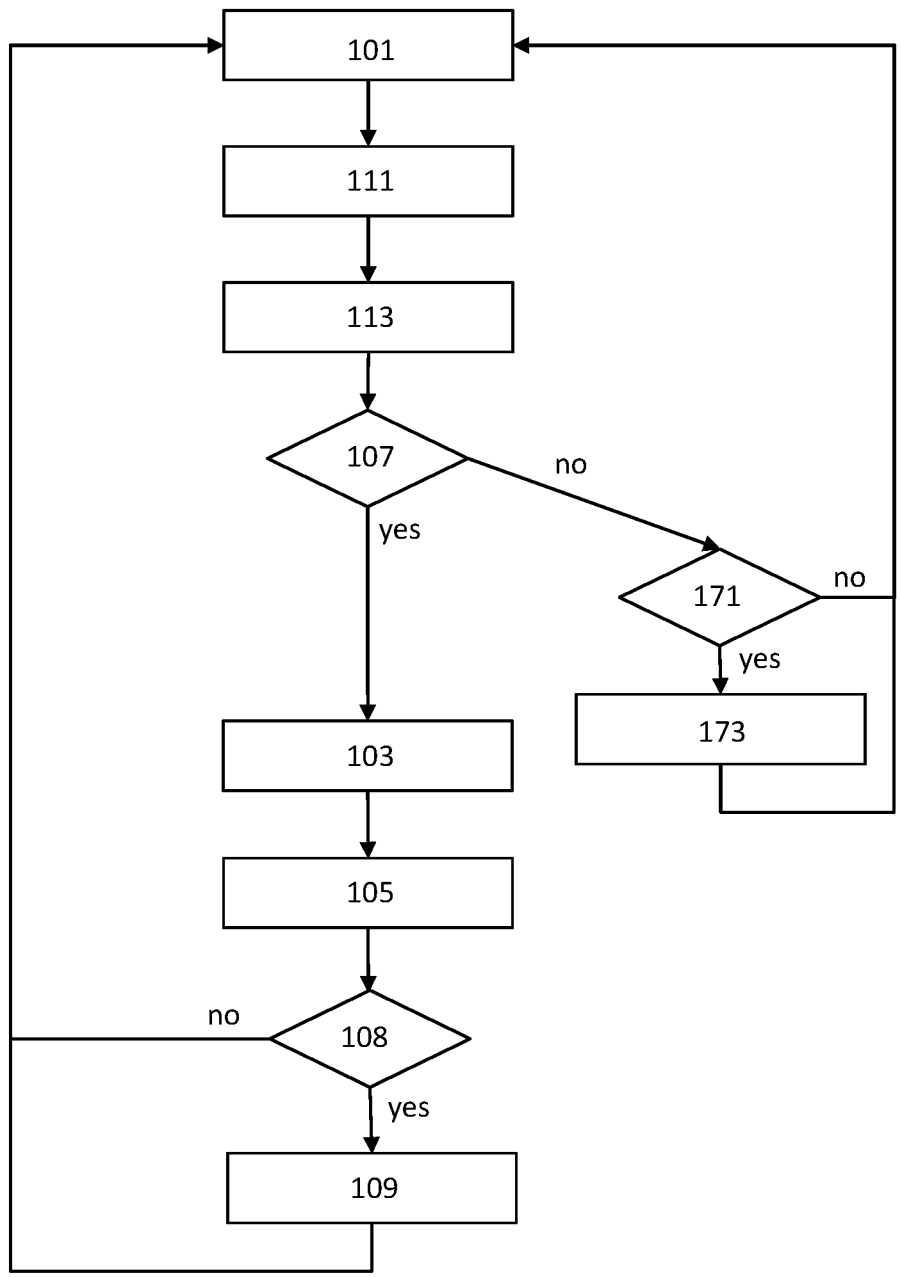
FIG. 6 is a flow diagram of a fourth embodiment of the method.

A fourth embodiment of the method of controlling a device by a short-range point-to-point radio frequency signal is shown in FIG. 6. Step 101 comprises receiving a signal. Step 111 comprises determining a characteristic of the signal received in step 101. Step 113 comprises storing the characteristic determined in step 111 along with a time stamp in a memory. Step 107 is performed after step 113. Step 107 comprises determining whether the signal received in step 101 is a short-range point-to-point radio frequency signal which comprises a control command. If not, a step 171 is performed next.

Step 171 comprises determining whether the signal received in step 101 comprises a user request to detect presence again, i.e. to rescan the space in which the lighting device is located. The user may first move to a different position, e.g. a different room, before using his mobile device to make this request. If the signal received in step 101 comprises this user request, a step 173 is performed.

Step 173 comprises transmitting signals to other devices, e.g. neighboring devices in the same sensor network. In the embodiment of FIG. 6, these signals comprise requests to transmit radio frequency signals to the controllable device, which are received in next iterations of step 101. In an alternative embodiment that includes steps 151 and 153 of FIG. 5, characteristics of the radio frequency signals transmitted by the controllable device to the other devices are determined by the other devices and transmitted to the controllable device and then received and stored by the controllable device in next iterations of steps 151 and 153.

Step 101 is repeated after step 173, after which the method proceeds as shown in FIG. 6. If it is determined in step 171 that the signal does not comprise a user request to detect presence again, step 101 is repeated and the method proceeds as shown in FIG. 6.

If it is determined in step 107 that the signal received in step 101 is a short-range point-to-point radio frequency signal which comprises a control command, step 103 is performed. Step 103 comprises determining changes in received radio frequency signals from the signals received in the current iteration and in previous iterations of step 101. Specifically, step 103 comprises obtaining the characteristics stored in the current iteration and the previous iterations of step 113 and determining changes in these characteristics, e.g. signal strengths.

Next, step 105 comprises detecting presence based on the changes determined in step 103. Step 108 comprises determining whether presence was detected in step 105. If so, a step 109 is performed next. If not, step 101 is repeated and the method proceeds as shown in FIG. 6. Step 109 comprises executing the control command determined in step 107, e.g. controlling one or more light sources. Step 101 is repeated after step 109, after which the method proceeds as shown in FIG. 6.

In the embodiment of FIG. 6, the user needs to send another control command after transmitting the request to detect presence again. In an alternative embodiment, steps 103, 105, 108 and a modified step 109 are performed automatically a certain time after step 173 has been performed, e.g. after a certain time has elapsed and/or after a certain number of signals has been received. In the modified step 109, the control command that is executed is the control command that was received before the user request to detect presence again was received.

The embodiments of FIGS. 3 to 6 differ from each other in multiple aspects, i.e. multiple steps have been added or replaced. In variations on these embodiments, only a subset of these steps is added or replaced and/or one or more steps is omitted. As a first example, steps 131, 133 and 135 of the embodiment FIG. 4 may be added to the embodiment of FIG. 5 and/or FIG. 6. As a second example, steps 151 and 153 of FIG. 5 may be added to the embodiment of FIG. 6.

Figure 7:
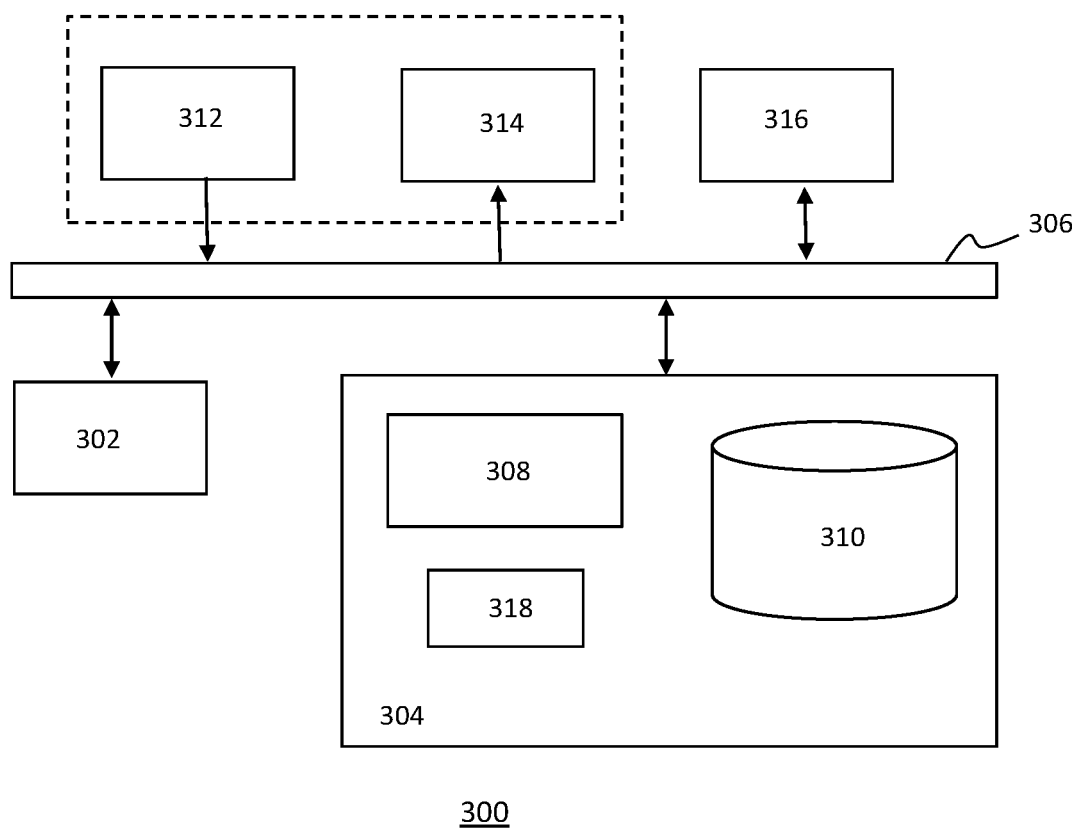
FIG. 7 is a block diagram of an exemplary data processing system for performing the method of the invention.

FIG. 7 depicts a block diagram illustrating an exemplary data processing system that may perform the method as described with reference to FIGS. 3 to 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 7 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A device controllable by a short-range point-to-point radio frequency signal, said device comprising:
   at least one input interface; and
   at least one processor configured to:
      receive one or more signals via said at least one input interface, said one or more signals having said short-range point-to-point radio frequency signal,
      determine changes in received radio frequency signals from said one or more signals,
      detect presence of a person based on said changes,
      determine a control command for controlling said device from said short-range point-to-point radio frequency signal, wherein said control command is comprised in said short-range point-to-point radio frequency signal, and
      execute said control command in dependence on said presence being detected such that said device is only controlled by the short-range point-to-point radio frequency signal when said presence is detected.

2. The device as claimed in claim 1, wherein said short-range point-to-point radio frequency signal conforms to a first communication protocol, said device is controllable by a further radio frequency signal transmitted by a further device, and said further radio frequency signal conforms to a second communication protocol different from said first communication protocol.

3. The device as claimed in claim 2, wherein said one or more signals comprise said further radio frequency signal, and said at least one processor is configured to determine a further control command from said further radio frequency signal, determine whether said further device is trusted, and execute said further control command in dependence on said further device being trusted.

4. The device as claimed in claim 2, wherein said further radio frequency signal is a short-range point-to-point radio frequency signal.

5. The device as claimed in claim 2, wherein said further radio frequency is a long-range radio frequency signal and/or is transmitted over a mesh network.

6. The device as claimed in claim 2, wherein said first communication protocol is Bluetooth and said second communication protocol is Zigbee.

7. The device as claimed in claim 1, wherein said at least one processor is configured to determine said changes by determining changes in signal strengths of said received radio frequency signals.

8. The device as claimed in claim 1, wherein said at least one processor is configured to determine said changes by determining changes between a recently received radio frequency signal and a reference radio frequency signal.

9. The device as claimed in claim 8, wherein said one or more signals comprise said recently received frequency signal and/or a characteristic of said recently received frequency signal.

10. The device as claimed in claim 8, wherein said recently received signal is received at most a predetermined amount of time before said short-range point-to-point radio frequency signal is received.

11. The device as claimed in claim 1, wherein said at least one processor is configured to both determine said changes in said received radio frequency signals and detect said presence based on said changes upon receiving said short-range point-to-point radio frequency signal and/or upon receiving a user request to detect presence again.

12. The device as claimed in claim 1, wherein said device is a lighting device and said control command comprises a color setting, an on/off setting, and/or a dim level.

13. A method of controlling a device by a short-range point-to-point radio frequency signal, said method comprising:
   receiving one or more signals, said one or more signals having said short-range point-to-point radio frequency signal;
   determining changes in received radio frequency signals from said one or more signals;
   detecting presence of a person based on said changes;
   determining a control command for controlling said device from said short-range point-to-point radio frequency signal, wherein said control command is comprised in said short-range point-to-point radio frequency signal; and
   executing said control command in dependence on said presence being detected such that said device is only controlled by the short-range point-to-point radio frequency signal when said presence is detected.

14. A non-transitory computer readable medium comprising computer program code to perform the method of claim 13 when run on at least one processor.

* * * * *